(12) United States Patent
Kim et al.

(10) Patent No.: US 6,544,913 B2
(45) Date of Patent: Apr. 8, 2003

(54) ALUMINA-SILICA CERAMIC

(75) Inventors: Cheol-Soo Kim, Daejeon (KR); Chang-Wook Kim, Daejeon (KR); Soon-Nam Chang, Daejeon (KR)

(73) Assignee: Agency for Defense Development, Daejon (KR)

( * ) Notice: Subject to any disclaimer, the term of this patent is extended or adjusted under 35 U.S.C. 154(b) by 139 days.

(21) Appl. No.: 09/765,753

(22) Filed: Jan. 19, 2001

(65) Prior Publication Data

US 2002/0137621 A1 Sep. 26, 2002

(51) Int. Cl.[7] .............................. C03C 14/00; F41H 5/00
(52) U.S. Cl. ........................... 501/32; 501/5; 501/95.3; 2/2.5; 89/36.02
(58) Field of Search ............................ 501/5, 32, 95.3; 2/2.5; 89/36.02

(56) References Cited

U.S. PATENT DOCUMENTS 5,112,777 A * 5/1992 Macdowell ................. 501/32
5,902,758 A * 5/1999 Hazeyama et al. ............ 501/5

FOREIGN PATENT DOCUMENTS

EP 276913 * 8/1988
JP 5-105508 * 4/1993

* cited by examiner

*Primary Examiner*—Karl Group
(74) *Attorney, Agent, or Firm*—Scully, Scott, Murphy & Presser

(57) ABSTRACT

A method of producing alumina-silica ceramic with mullite whisker structure has been produced as armor materials for protecting high velocity projectile. The mixing composition of starting powders consists of alumina, quartz, kaoline, feldspar and talc, and the green compacts were sintered at the temperature range from 1200 to 1450° C. for 0.5 to 3 hours. Mullite whisker structure in the ceramic was fabricated and grown in the period of liquid phase sintering. The whisker phase of mullite is homogeneously distributed in the ceramic.

2 Claims, 4 Drawing Sheets

ALUMINA-SILICA CERAMIC

BACKGROUND OF THE INVENTION

1. Field of the Invention

The present invention relates to alumina-silica ceramic and producing method thereof, more particularly to alumina-silica ceramic for protecting high velocity projectile.

2. Description of the Background Art

For the development of a good armor material, it is very important to design the microstructure of an armor material according to protective mechanism. The schematic diagram, which illustrates behavior during the penetration of projectile into a ceramic block, is drawn in FIG. 1. A severe plastic deformation and self-eroding of projectile 10 were occurred simultaneously while projectile were penetrating into a ceramic block 20. Also, the crushed small ceramic particles (region A) moved in reverse of projectile's moving direction as illustrated in FIG. 1. At the region B in FIG. 1, the crushed small ceramic particles moved to the center of projectile. These particles collided against projectile and then scattered to the outside. According to the above mechanism, the followings are must be considered to design the microstructure of armor materials; First, it has to have a large capability of attenuation against high velocity shock wave. Second, it has to attenuate high velocity tensile/shear wave and consolidate dynamic fracture strength. Finally, it has a capability to be crushed to small particles and then scattered to the outside with high velocity. In order to demolish the head of projectile, the material can endure high velocity and high pressure shock wave as long as possible.

SUMMARY OF THE INVENTION

It is therefore an object of the present invention to design the microstructure of ceramic and to produce the designed ceramic material.

In order to achieve the above-described object of the present invention, there is provided alumina-silica ceramic for protecting high velocity projectile comprising: 30–40 vol. % of sphere-shaped alumina and 10–65 vol. % of mullite whisker as hard phases, and 5–50 vol. % of glass phase surrounding the hard phases.

There is also provided a method of producing alumina-silica ceramic for protecting high velocity projectile, comprising the steps of: mixing and milling 17–58 wt. % of alumina, 20–27 wt % of quartz, 27–35 wt % of kaoline, 8–11 wt % of feldspar and 2–3 wt. % of talc to make a slurry; adding a deflocculant and a binder into the slurry; drying the mixed slurry to powders; pressing dried powders to form a green body; sintering the body in a furnace; and cooling the body in the furnace.

The foregoing and other objects, features, aspects and advantages of the present invention will become more apparent from the following detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
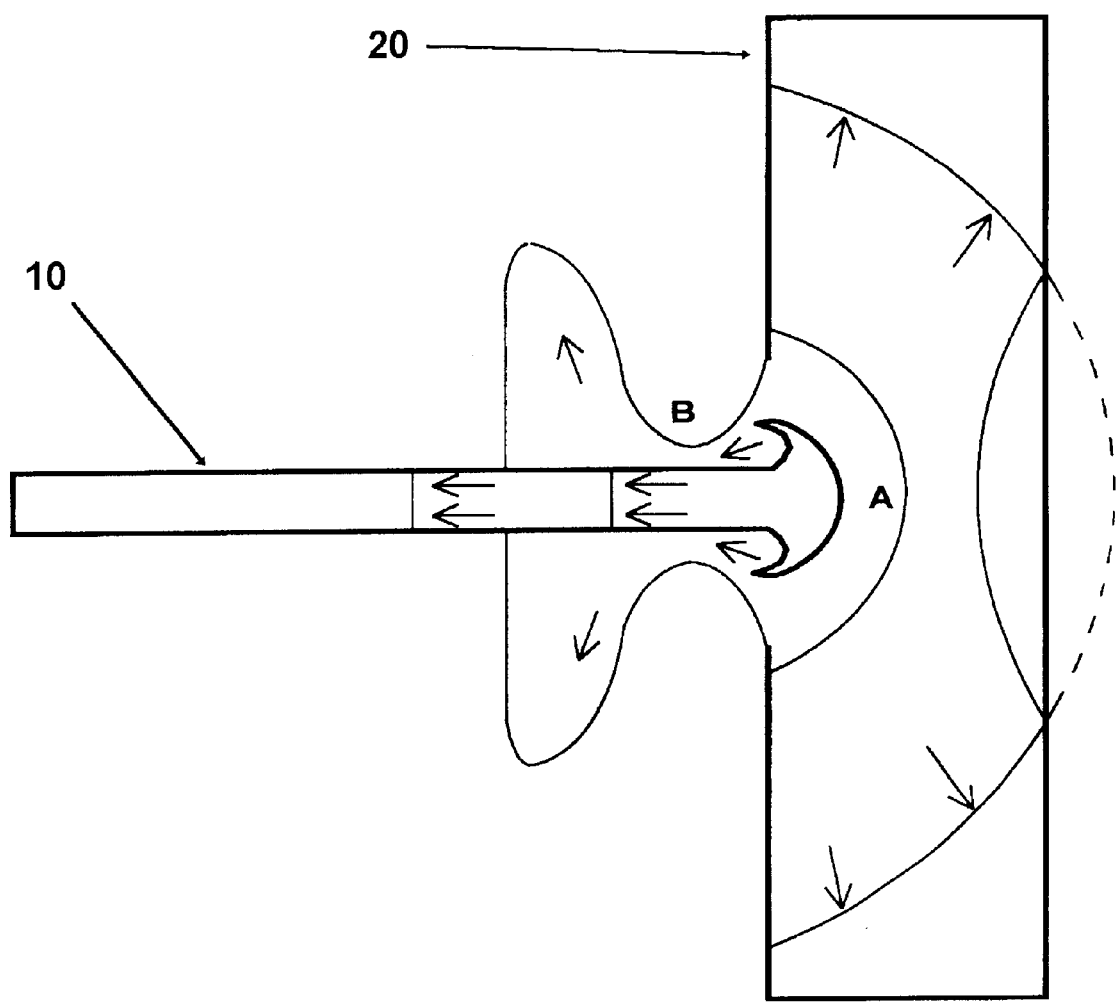
FIG. 1 is a schematic view illustrating the behavior of ceramic material while the long-rod penetrator is penetrating into ceramic.

To improve the ballistic property of ceramic as an armor material, the present invention provides an alumina-silica ceramic in which hard phases such as alumina and mullite are surrounded by glass phase. The hard phases, sphere-shaped alumina and mullite whisker, effectively protect the head of projectile. On the other hand, the glass phase may disturb the projectile from the side of its moving direction.

The present invention also provides a method for manufacturing process of alumina-silica ceramic consisting of alumina, quartz, kaoline, feldspar and talc, comprising the steps of: mixing and milling the starting powder; spray drying of slurry; forming the spray dried powder at the pressure range from 1700 to 1850 kgf/cm$^2$; sintering the green compact at the temperature range between 1200 and 1450° C. for 0.5 to 3 hours; and furnace cooling. The mullite whisker is fabricated and homogeneously distributed during the sintering process.

The hard phases, which has high compressive strength and high toughness, are needed to absorb the impact/compressive energy of projectile. On the other hand, another phase which has an instantaneously high compression-expansion ratio is needed to disturb projectile from the side. $TiB_2$, $B_4C$, $SiC$, $Al_2O_3$, $AlN$ and $Si_3N_4$ are ceramics which consist of hard phase. Among them, $Al_2O_3$ is selected as a hard phase material because $Al_2O_3$ has good mechanical properties as well as its relatively low manufacturing cost. The selected other phase which has an instantaneously high compression-expansion ratio is a glass phase. The designed microstructure of structural material is that hard phases are distributed over a glass phase. The hard phases are $Al_2O_3$ particle and mullite ($3Al_2O_3.2SiO_2$) whisker. Alumino-silicate glass is chosen as a glass phase.

In order to manufacture ceramics with designed microstructure, it is most effective way to fabricate the designed microstructure during the sintering period. This manufacturing process is relatively cheap and simple. Also, this process can make whisker type mullite homogeneously distributed all over the material.

In the example of the present invention, corundum and quartz were used as alumina and silica, respectively. Kaolinite ($Al_2O_3.2SiO_2.2H_2O$) was used because it can lower the alumina-silica reaction temperature, and can form mullite and silica glass phase through thermal decomposition reaction at high temperature. Feldspar ($K_2O.Al_2O_3.6SiO_2$) and talc ($3MgO.4SiO_2.H_2O$) were used as one of starting powders to format alumino-silicate glass phase at low temperature. Two different sorts of feldspar were used; one is potash feldspar contained $K_2O$, and the other is soda feldspar contained $Na_2O$.

During the manufacturing process, kaolinite was decomposed into glass phase which has high concentration of mullite and silica. This high concentration of mullite and silica accelerates the formation of mullite whisker via the nuclei formation of mullite at high temperature. Some portion of alumina was melted and the alumina concentration in glass phase was increased. This alumina in glass phase was reacted with silica. It is expected that the mullite whisker plays the part of dispersion of shock waves which influence the destruction of armor material.

Figure 2:
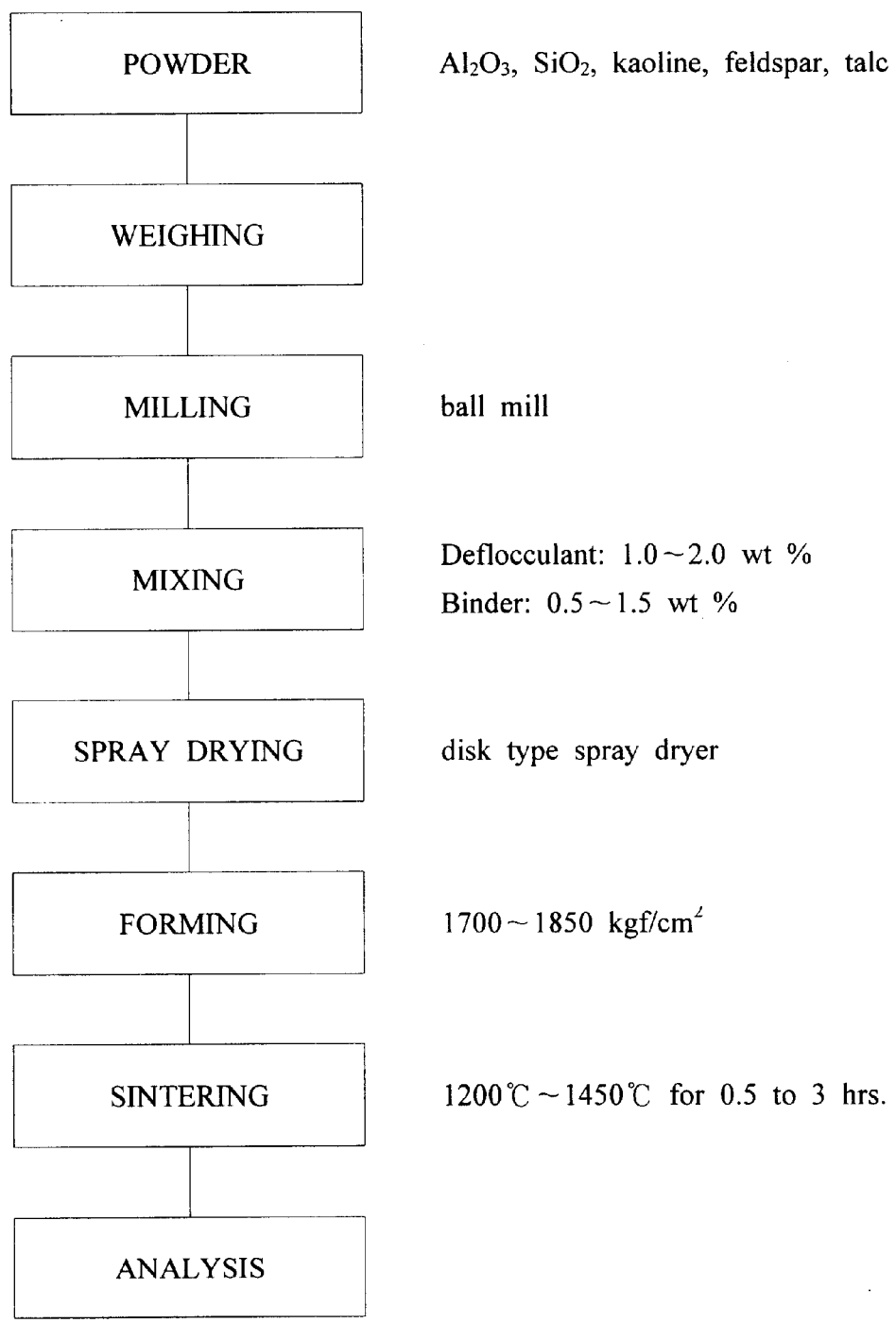
FIG. 2 is a diagram illustrating the procedure of a method for fabrication of alumina-silica ceramic with mullite whisker in it.
Figure 3:
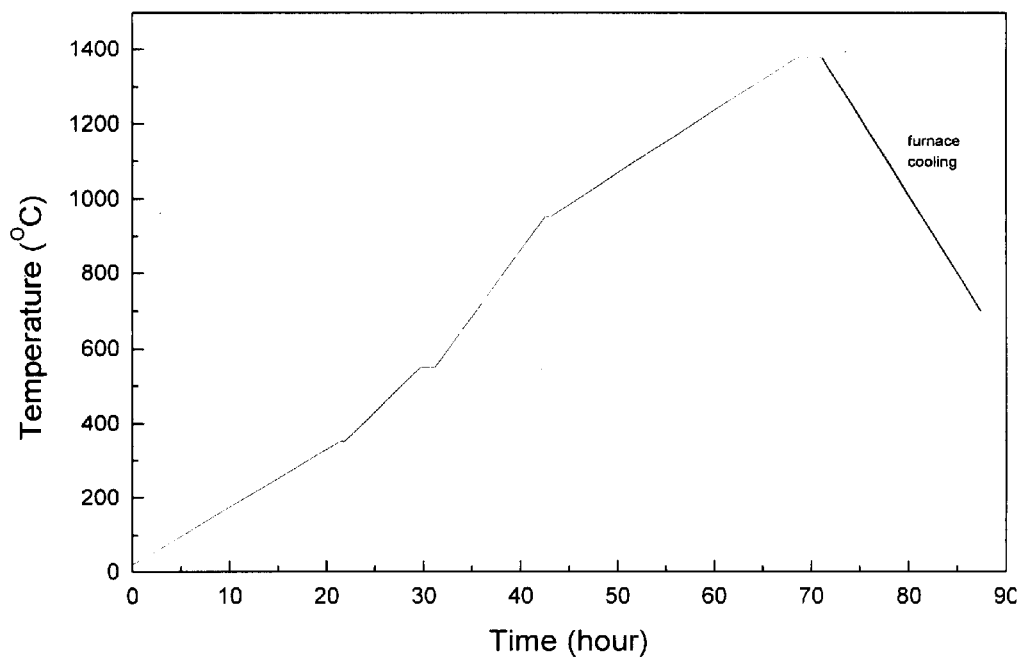
FIG. 3 is a graph illustrating a thermal history of liquid phase sintering process of Specimen-1.
Figure 4:
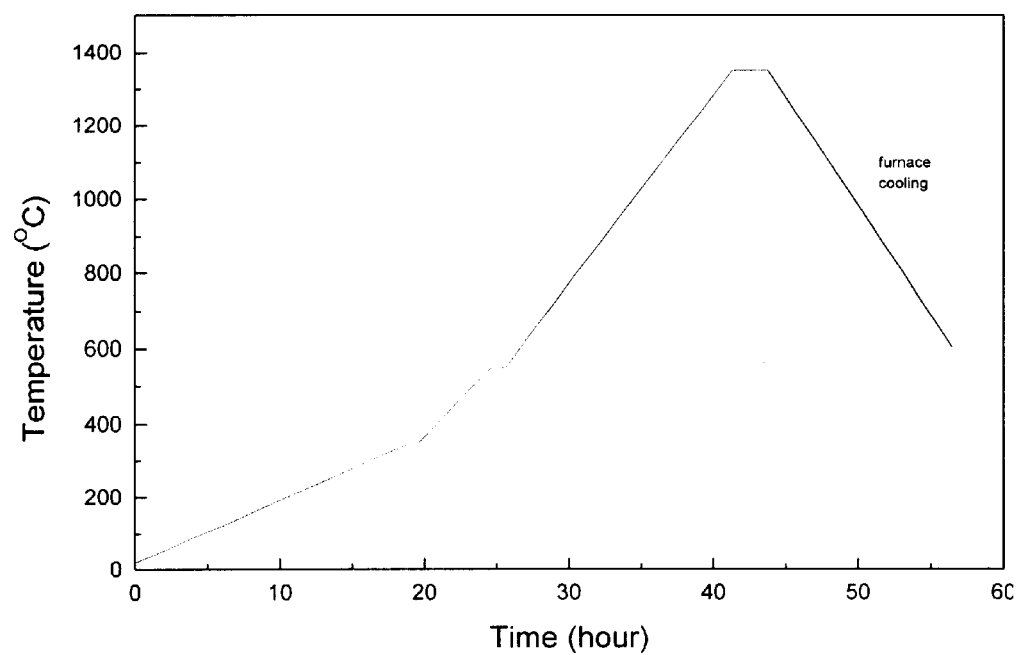
FIG. 4 is a graph illustrating a thermal history of liquid phase sintering process of Specimen-2 and -3.
Figure 5:
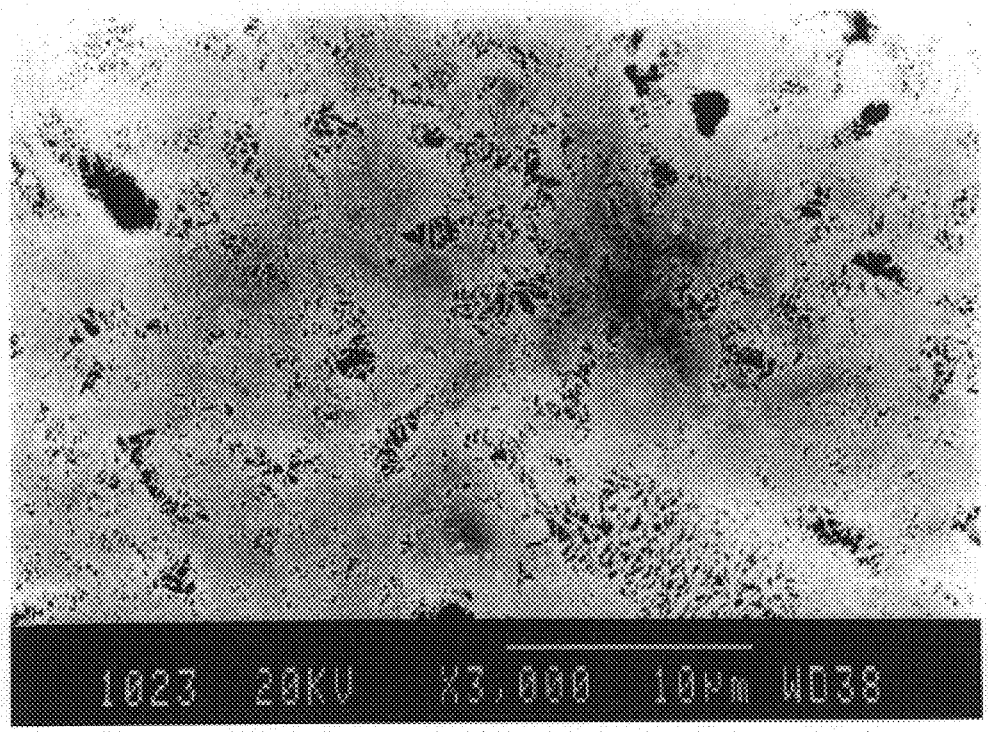
FIG. 5 is a scanning electron microscopic (SEM) photograph of a alumina-silica ceramic composite.

Referring to FIG. 2, this diagram illustrates the manufacturing process according to the present invention. As shown in FIG. 2, cordundum, quartz, kaoline, feldspar, and talc powders were weighed to a desired composition, and then green body was made under a pressure of 1700 to 1850 kgf/cm². Thereafter, the green compact was sintered at the range from 1200 to 1450° C. for 0.5 to 3 hours. The examples of thermal histories for sintering are shown in FIG. 3 and FIG. 4.

The microstructure of the ceramic of the present invention consists of $Al_2O_3$ (30–40%) and mullite whisker (10–65%) which are surrounded by glass phase (5–50%). The pore (less than 1%) is homogeneously distributed through the material. The mullite whisker was hydrostatically pressurized by glass phase which has a large thermal expansion coefficient during the cooling period after sintering. The durability against tensile fracture was enhanced by this pressurized state of mullite whisker. Another factor which can absorb impact energy was phase transformation of solids. Followings are several kinds of phase transformation which can occur in the microstructure of ceramic of the present invention.

$$Al_2O_3 + SiO_2 \rightarrow Al_2SiO_5$$

$$MgO + SiO_2 \rightarrow MgSiO_3$$

$$SiO_2 \text{ (quartz)} \rightarrow \text{coesite and/or stishovite}$$

When the high velocity shock wave is induced to an armor material, the pressurized area will absorb dynamic energy via modification, phase transformation, etc. The temperature of material itself will be increased by this energy absorption. After that, the temperature will be decreased by the release of high velocity impact wave. Therefore, the glass phase will act like liquid when high velocity impact wave is induced because the temperature is increased by the absorption of impact energy. This liquid-like phase will be solidified when the high velocity impact wave is released, and then the solidified particles will be expelled to the outward.

The present invention will be understood more readily with reference following examples; however, these examples are intended to illustrate the invention and are not be construed to limit the scope of the present invention.

EXAMPLE

The starting materials were alumina, silica, kaoline, feldspar, and talc powders. The chemical compositions of these powders were analyzed to make powder mixtures which had different alumina and silica contents each other. There were three different specimen compositions; 65%, 51% and 25% of $SiO_2$ by weight. The detailed chemical compositions of each specimen were shown in Table 1.

TABLE 1

|  | $Al_2O_3$ | $SiO_2$ | MgO | $K_2O$ | $Na_2O$ | $Fe_2O_3$ | CaO |
|---|---|---|---|---|---|---|---|
| Specimen-1 | 29.5 | 65.1 | 0.9 | 2.9 | 1.0 | 0.1 | 0.5 |
| Specimen-2 | 45.5 | 50.9 | 1.3 | 1.7 | 0.4 | 0.1 | 0.1 |
| Specimen-3 | 71.8 | 24.7 | 1.3 | 1.7 | 0.3 | 0.1 | 0.1 |

The alumina, silica, kaoline, feldspar, and talc powders were weighed for the desired chemical compositions and wet blended in water. Mixing was performed in a ball mill, with all balls and pot consisting of $Al_2O_3$ ceramic material. After mixing for 48 hours, 1.5 weight % of Darvan-C and 1.0 weight % of PVA #217 were added as a deflocculant and a binder, respectively. The slurry was mixed 3 more hours before spray drying. The disk type spray dryer was used to granulate the slurry to spherical shaped powder.

The green compact, which has a size of 100 mm×100 mm×25 mm, was formed by uniaxial press at a pressure of 1717 kgf/cm². Thereafter, the sintering was proceeded in an electric furnace according to thermal history shown in FIG. 3 to obtain Specimen-1. The forming pressure for Specimen-2 and Specimen-3 was 1803 kgf/cm², and sintering schedule is shown in FIG. 4.

Some mechanical properties of specimens which were manufactured in different conditions were shown in Table 2.

TABLE 2

| Specimen | Property | | | | | |
|---|---|---|---|---|---|---|
|  | Porosity (%) | Density (g/cm³) | Modulus of rupture (MPa) | Fracture Toughness (MPa·m^{1/2}) | Young's modulus (GPa) | Hardness (GPa) |
| Specimen-1 | 0.19 | 2.50 | 114 | 2.83 | 103 | 5.7 |
| Specimen-2A | 0.95 | 2.68 | 159 | 2.63 | 116 | 6.3 |
| Specimen-2B | 1.41 | 2.67 | 147 | 3.02 | 115 | 6.5 |
| Specimen-3A | 0.11 | 3.05 | 231 | 3.63 | 173 | 7.9 |
| Specimen-3B | 0.11 | 3.02 | 211 | 3.69 | 178 | 7.8 |

The alumina-silica ceramic in accordance with the present invention has a modulus of rupture from 114 MPa to 231 MPa, and a fracture toughness from 2.63 to 3.69 MPa·m^{1/2} as shown in Table 2. Accordingly, the ceramic has excellent protection capability against high velocity projectile.

As the present invention may be embodied in several forms without departing from the spirit or essential characteristics thereof, it should also be understood that the above-described example is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. Alumina-silica ceramic for protecting high velocity projectile comprising:
   30–40 vol. % of sphere-shaped alumina and 10–65 vol. % of mullite whisker as hard phases, and 5–50 vol. % alumino-silica glass surrounding the hard phases.

2. Alumina-silica ceramic according to claim 1, wherein pores are distributed in the ceramic with the porosity of 1 vol. %.

* * * * *